United States Patent Office 3,548,273
Patented Dec. 15, 1970

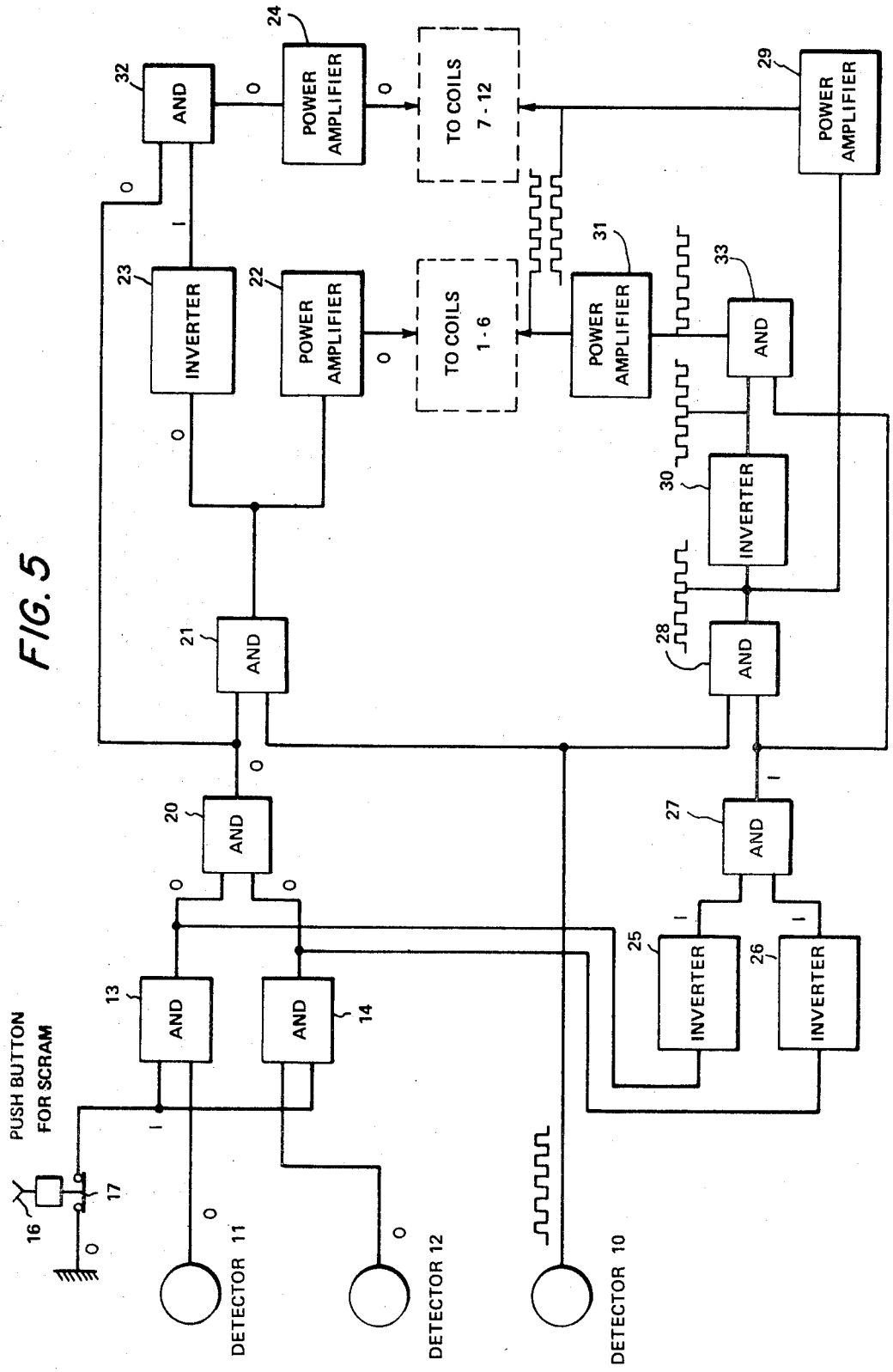

3,548,273
LINEAR MOTOR CONTROL SYSTEM
Luciano Parodi and Maurizio Vallauri, Turin, Italy, assignors to Fiat Societa per Azioni, Turin, Italy, a joint-stock company of Italy
Continuation-in-part of application Ser. No. 643,460, June 5, 1969. This application Sept. 19, 1969, Ser. No. 865,228
Claims priority, application Italy, June 7, 1966, 13,223/66
Int. Cl. H02k *41/00*
U.S. Cl. 318—135          3 Claims

ABSTRACT OF THE DISCLOSURE

The invention is concerned with electromagnetic linear motors of the type having a plurality of stationary coils surrounding the movable member of the motor and is particularly concerned with the provision of integrated means for accelerating and decelerating the fall of the movable member of the motor under gravity, both the acceleration and deceleration being effected by electrical means. The coils are selectively energized by a programmer which is under the control of position detectors. The position detectors and the programmers together provide for the energization of various coils at various times to provide for acceleration of the fall of the movable member during an initial stage and the deceleration thereof at a later stage.

CROSS-REFERENCE TO RELATED APPLICATIONS

This application is a continuation-in-part of application Ser. No. 643,460, filed June 5, 1969, now abandoned.

Co-pending application Ser. No. 830,564, filed May 18, 1969, a continuation-in-part of application Ser. No. 492,663, filed Oct. 4, 1965, now abandoned, is assigned to the assignee of the present application and discloses in detail the type of linear motor to which the present invention pertains.

SUMMARY OF THE INVENTION

The present invention relates to electromagnetic motors and improvements thereto making them particularly suitable for handling rods in a nuclear reactor.

Electromagnetic linear motors which are already known and which are particularly suitable for controlling the movements of a control rod in a nuclear reactor for instance by lifting and lowering the said rod. This is achieved by arranging for the suitable switching of an electric current supply to a plurality of stationary coils associated with a movable member which is arranged to influence the position of the rod and in such a motor the member may be held in a fixed position by feeding certain coils selected in dependence upon the position desired.

In motors of the abovementioned type cessation of the current supply to all the coils in the event of an accident or a pre-arranged control, frees the movable member from the influence of the coils, so that it is free to move, or be moved, vertically under the action of any other forces. In practice the forces most relevant are those of gravity and the member thus moves as a result of its own weight. Behaviour of this kind is of course very advantageous in certain circumstances, for instance when the motor is used to influence the control rods of a nuclear reactor in the manner of the above example, because safety requirements are met in that the control rods may thus be quickly introduced into the reactor to shut it down in the event of an emergency. Often, such introduction is effected by gravitational forces alone but in some cases it is accelerated by the action of a pre-stressed spring or by an electrodynamic action of the pulsed type, the power for which is supplied by a pre-loaded electric capacitor.

Normally, the rapid introduction of the control rod by such means is halted near the stroke end, this being achieved by braking with a mechanical, e.g. spring, hydraulic or pneumatic damper.

The object of the present invention, however, is to provide in a linear induction motor of the type disclosed in the aforementioned co-pending application, integrated facilities both for effecting acceleration of the movable member and for effecting braking at any point of the stroke thereof, more particularly at its bottom end.

According to these and other objects, the present invention relates to an electromagnetic linear motor of the type disclosed in the co-pending application, more particularly for handling a control rod in a nuclear reactor, and comprises electric detectors adapted to sense the position of the movable member of the motor with respect to the motor's stationary casing on which are mounted a plurality of coils or electromagnets, electric programmers being so electrically connected to the detectors and to the coils as to receive from the detectors signals denoting the position of the movable member and to cause energization of selected coils in a predetermined sequence, such energization being thus dependent both upon the position occupied by the movable member and upon a predetermined program for controlling its movement.

BRIEF DESCRIPTION OF THE DRAWING

These and other objects and advantages of the invention will be clear from the accompanying drawings which illustrate a preferred embodiment of the invention and in which:

FIGS. 3–5 are schematic diagrams illustrating logic circuits for controlling the three stages of operation of the motor.

DESCRIPTION OF A PREFERRED EMBODIMENT

Figure 1:
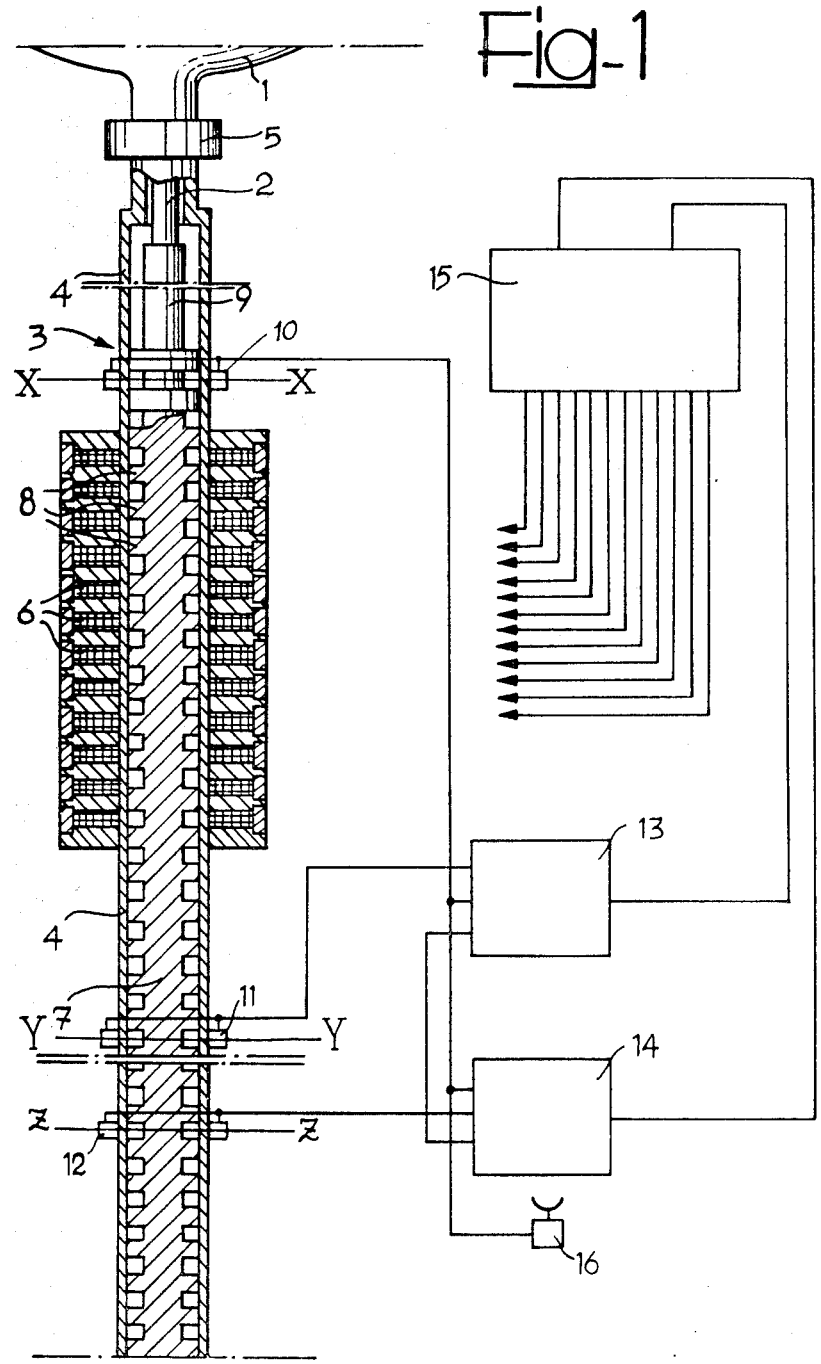
FIG. 1 is a semi-diagrammatical axis sectional view of an electromagnetic motor arranged in accordance with the invention for the control of a nuclear reactor.

In FIG. 1, a tightly sealed container 1 has movably arranged therein a plurality of rods (not shown) for controlling the power of a nuclear reactor, a rod or rods being handled by means of a bar 2 which is remotely controlled by the electromagnetic motor 3.

The stationary portion of the motor 3 comprises a vertical casing 4 sealing secured to the container 1 by means of a sleeve 5. The motor stationary portion also comprises a plurality of similar annular coils or electromagnets 6 coaxially secured to the casing 4. The movable portion of the motor 3 comprises an elongated core 7 of ferromagnetic material coaxially slidable within the casing 4 and provided with a plurality of equally spaced annular projections 8. As shown, the core 7 is secured to the lower end of the bar 2 by means of a suitable coupling 9. In the illustrated embodiment the length of the axial section of the casing 4 over which the coils 6 and projections 8 face one another includes twelve coils and eleven projections.

According to the invention three position detectors 10, 11, and 12, which for example may be of the photoelectric cell or electromagnetic type, are arranged in spaced relationship along the axis of the casing 4. For the purpose of describing the preferred embodiment, the detectors will be assumed to be of the photoelectric type.

The detector 10 is arranged at the upper end of the casing 4 and electrically signals whether one of the annular projections 8 is present in a given plane X—X orthogonal to the motor axis. The detector 12 is situated at the lower end portion of the casing and electrically signals whether the end of the core 7 is above or below another plane Z—Z orthogonal to the axis of the motor 3. The detector 11 is arranged intermediate the detectors 10 and 12 and electrically signals whether the end of the core 7 is above or below the plane Y—Y orthogonal to the axis of the motor 3.

The detectors 11, 12 are adapted to detect whether the end of the core 7 has reached a given position corresponding to the planes Y—Y and Z—Z, respectively; this may be obtained by a lamp-photocell system having an axis othogonal and co-planar with the axis of the core 7.

The detector 10 is such as to detect projections on the core 7. This may be obtained by a lamp photocell system having its axis orthogonal to the axis of the core 7, but tangential to a mean cylinder between the hollows and crests on the core 7.

An electric circuit 13 is connected to receive signals from the detector 11 and to transmit such received signals to an electric circuit 15, which is of the variable program type and is arranged to feed the coils 6. An electric circuit 14 is connected to receive signals from the detector 12 and to transmit these signals to circuit 15.

The electric circuits 13 and 14 are also electrically connected with each other, and both circuits and detector 10 are connected with a control adapted to provide for fast fall or scram of the bar 2 and consequent rapid insertion of a control rod or rods into the reactor. This control is diagrammatically denoted by the symbol of a push button 16 having two positions, one corresponding to a logical 1 level, and the other to a logical 0 level.

Actuation of the control 16, while the core is held at rest by the energization of selected coils, serves to cut off the current supply to all the coils 6 and so causes the first stage A of the downward movement of the bar 2 to commence under the influence of gravity. Thus, at the start of this first stage the bar 2 moves downwards (i.e. downwards in FIG. 1) solely under the influence of gravity and with the button 16 no longer actuated there is soon caused, however, the issue of a signal from the detector 10. This signal is transmitted to the circuit 15 via the electric circuit 13 and effects controlled current supply to selected coils so that an accelerating pulse is given to the core 7 in concord with the action of gravity.

Figure 2:
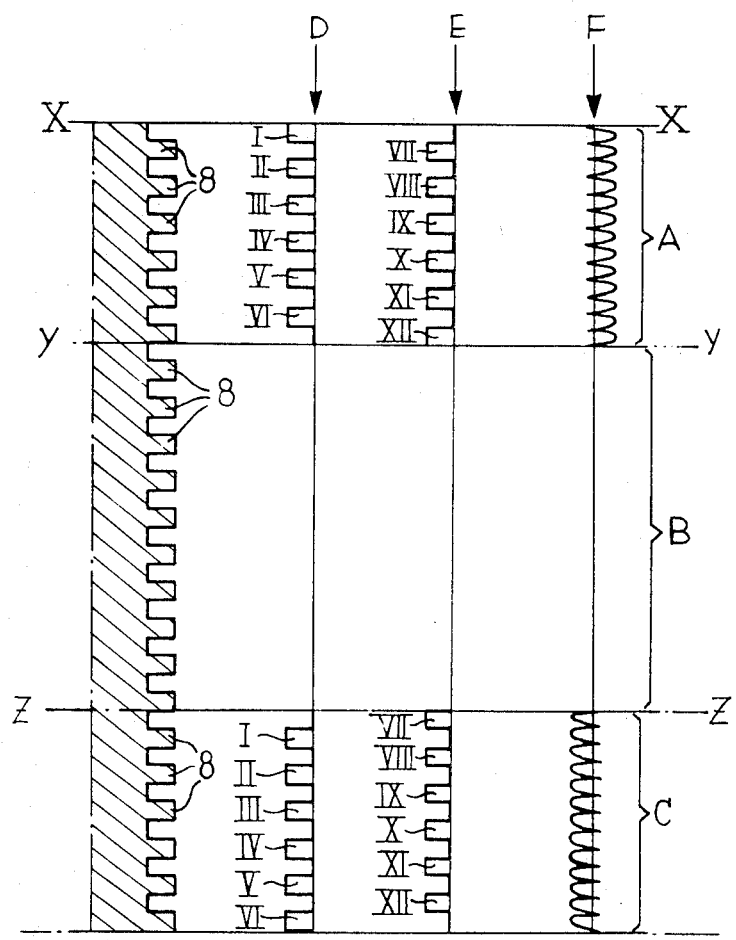
FIG. 2 is a diagram showing, by way of example, a switching cycle for the coils of the motor shown in FIG. 1.

FIG. 2 shows by way of example how such selected current supply is achieved.

At the start of Stage A, as illustrated, the detector 10 will signal the absence of a projection 8 in the reference plane X—X. At this moment, the circuit dictates that the coils I, II, III, IV, V and VI be fed and thus energized and that the coils VII, VIII, IX, X, XI and XII be not fed and thus de-energized. This is illustrated at the tops of vertical lines D and E in FIG. 2. These coils are selected in dependence upon the geometrical position of the reference plane X—X with respect to the remaining parts of the motor.

As a result of the concordant actions of gravity and of the accelerating pulse, the core moves downwards and successively changes in position with respect to the coils. It thereby modifies the interaction with the stationary electromagnetic circuits in the manner described in the pending application; this interaction (which is positive in action with respect to the effects of gravity) reaches a maximum value which is shown by the vertical line F at the top of FIG. 2, and thereafter reduces towards zero and serves as a brake. However, before an appreciable braking effect can result, the detector 10 signals a change because one of the projections 8 will have by now entered the reference plane X—X. This signal causes energization of the coils VII, VIII, IX, X, XI, XII and cuts off the current supply to the coils I, II, III, IV, V, VI thereby de-energizing them. The coils VII, VIII, IX, X, XI, XII create in the core 7 and electromagnetic interaction which is equal in value, but opposite in sense, to the action of the coils I, II, III, IV, V, VI. In consequence, they now serve to supply an accelerating pulse concordant with gravity during the subsequent downward displacement of the core by half the pitch of the projections 8.

On each displacement of the core by half the pitch of the projections 8 the signal from the detector 10 causes switching of the current supply from one to the other set of coils so that the acceleration pulses produced constantly act in the direction of, and in concord with, gravity.

The first stage A of downward movement of the rod 2 ends when the lower and leading end of the core 7 reaches the plane Y—Y. The second stage B of downward movement then starts immediately because the signal thus produced from the detector 11 is arranged to cut off the supply of current to all the coils 6. The core 7, which is no longer under magnetic control, is thus then influenced solely by gravity.

The third stage C of the downward movement of the core 7 starts when the lower and leading end of the core 7 extends through the plane Z—Z, the signal from the detector 12 being arranged to cause a supply of current to selected coils and the creation of an accelerating pulse opposite in direction to the forces of gravity. This is obtained by selecting and supplying current to the coils VII, VIII, IX, XI and XII when there is no projection 8 in the reference plane X—X and by selecting and supplying current to the coils I, II, III, IV, V, VI when a projection 8 does lie in the reference plane X—X. These cases are illustrated at lines D and E at the bottom of FIG. 2, and the resulting action equals in value, but is opposite in sense to, the action created at the accelerating stage. This latter circumstance is exemplified at line F at the bottom of FIG. 2.

Braking may be continued until the core 7 has ceased to move and, as a mechanical abutment is provided at the downward stroke end, the motor core can be left in this end position merely de-energizing all the coils. Alternatively, an extraction stroke may be started as described in the co-pending application.

The structure and operation of the components 10 to 16 of the control system according to the invention shall be more particularly described with reference to FIGS. 3, 4 and 5.

Figure 3:
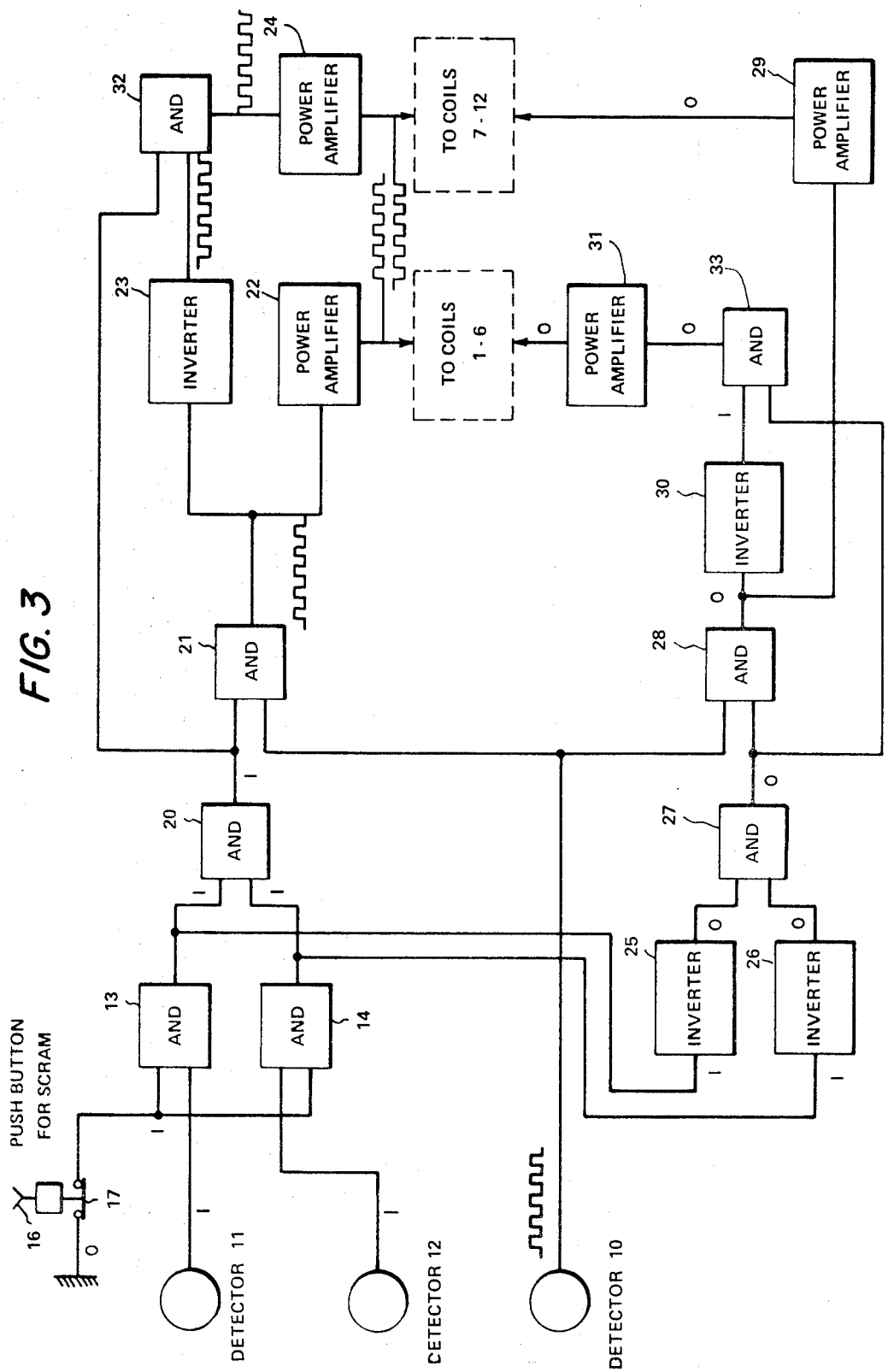
Figure 4:
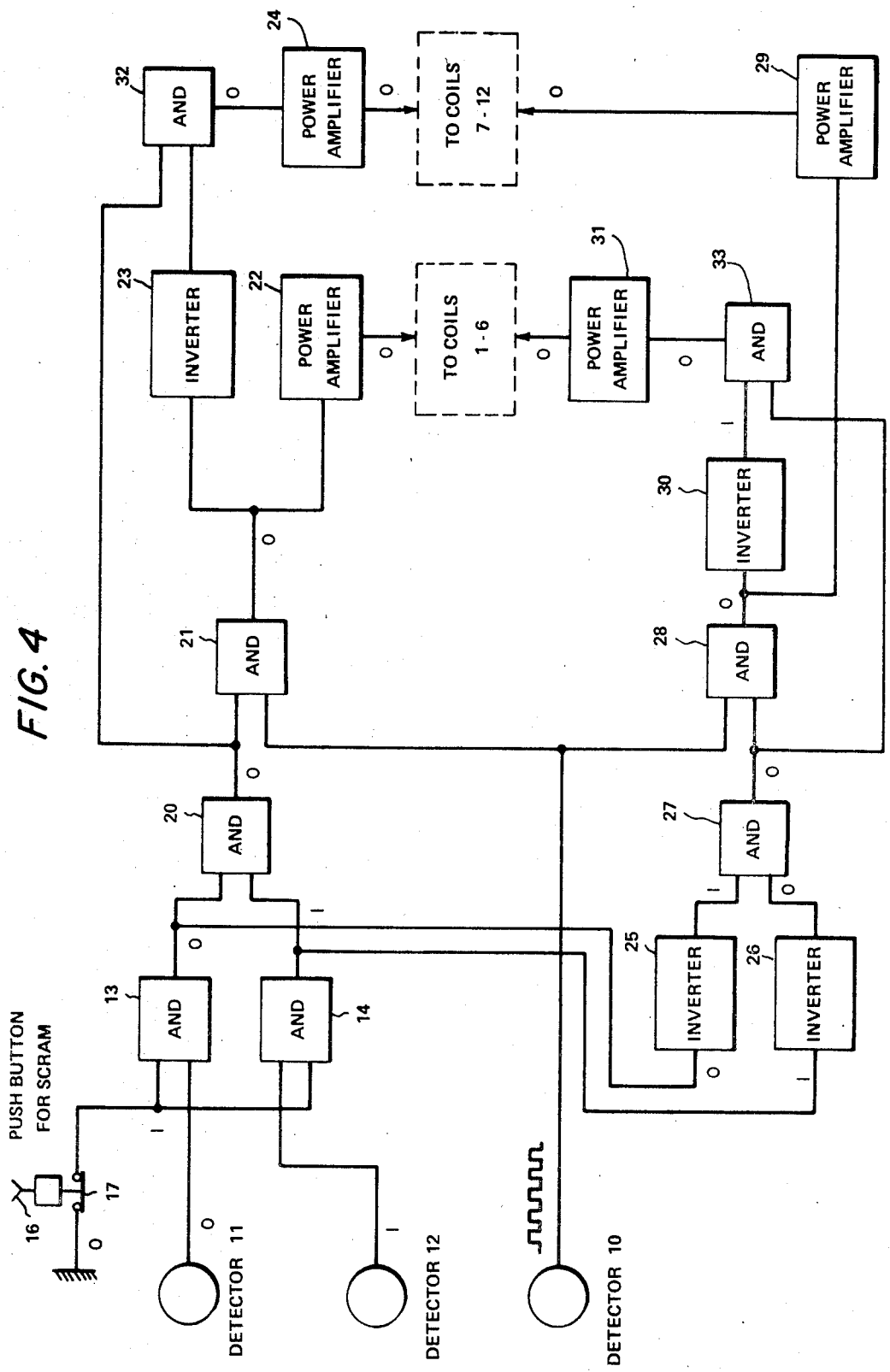

FIGS. 3, 4 and 5 show in greater detail the right-hand portion of said FIG. 1 in concomitance with three distinct operation steps of the control circuits.

Operation of the push button 16 initiates the beginning of the fall (scram) by opening switch 17 which cuts off current from the coils 6.

The fall may be subdivided into three steps:

(1) Accelerated fall (FIG. 3) between the top stroke end position and the point on the downward path at which the bottom end of the core 7 intersects the plane Y—Y. During this period the fall is accelerated because the absence of a signal from the photocell detectors 11 and 12 causes a level 1 logical signal at each of their outputs, this condition corresponding for instance to light incident on the photoelectric cell of both detectors. Operation of the scram pushbutton 16 also produces a level 1 during fall causing AND circuit 20 to produce a level 1 output which gates the signal from the photoelectric cell 10 through AND 21. The AND circuits are of the type which produce a level 1 output when both inputs are at level 1, but produce a level 0 output when either or both inputs are at level 0.

This signal is amplified in the power amplifier 22, the output of which feeds according to a desired phase the coils I to VI of the group of coils 6. This signal is also reversed in the phase inverter 23 and amplified in the amplifier 24 from which it flows to and feeds the coils VII to XII of the group of coils 6 according to an opposite phase with respect to the windings I to VI. Such signal may be gated in AND 32 by a signal preventing, during the fall by gravity and during the braked fall, the windings VII to XII from being constantly fed, as will hereafter be explained.

All windings thereby contribute by alternate phases towards applying a downward thrust on the core 7, as indicated by the line F, FIG. 2 (Section A) of the drawings.

The inverters 25 and 26 supply an output signal 0 which, by flowing through AND 27, prevents at the input of AND 28 the signal from the detector 10 from proceeding further along this path towards the coils 6.

(2) Fall by gravity (FIG. 4) between the point on the downward path at which the end of the core 7 intersects the plane Y—Y and the point at which said end intersects the plane Z—Z. During this period fall takes place by gravity because the presence of the signal at the detector 11 and the absence of a signal at the detector 12 results in levels of 0 and 1 at the outputs of AND 13 and AND 14, respectively, and levels of 1 and 0 at the outputs of the polarity inverters INV 25 and INV 26, respectively.

The output signals from AND 20 and AND 27 are therefore both 0 and prevent the output signals from the photocell detector 10 from proceeding beyond AND 21 and AND 28, so that the windings 6 are not supplied with current.

(3) Braked fall (FIG. 5) between the point of the downward path at which the end of the core 7 intersects the plane Z—Z and the bottom stroke end. During this period the fall is braked because both inverters 25 and 26 yield at the AND 27 output a signal 1 which gates the signal from the photocell 10 through AND 28.

The signal is amplified in the power amplifier 29 and after phase reversal by the inverter 30 and gating through AND 33 is also amplified in power amplifier 31. The output signals from the power amplifiers 29 and 31 feed the coils VII to XII and I to VI, respectively, of the group of coils 6 according to phases exactly opposite those according to which they are fed during the accelerated fall of step 1 (FIG. 3). All the coils 6 thereby contribute by alternate phases towards applying an upward braking force on the core 7, as indicated by line F in FIG. 2 (Section C). The 0 level signals from AND 13 and AND 14 cause AND 20 during this period to yield a 0 output which at the input of AND 21 prevents the signal from the detector 10 from proceeding further along this path towards the windings 6.

Various modifications of the present invention are possible within the scope of the appended claims. For instance, the detectors 10, 11, 12 may be arranged to supply a positive control signal either when they sense a presence or when they sense an absence, or they may even be arranged to supply a different but positive signal in each case.

What we claim is:

1. A linear motor control system including a linear electromagnetic motor for controlling the movements of a control rod in a nuclear reactor, said motor having a plurality of fixed stationary coils and a linearly movable member coupled to said rod and associated with said coils, said coils being arranged to influence the position of said movable member which is adapted to be held in a fixed position by electrically energizing certain coils selected in accordance with a desired position, said system comprising electric detectors for sensing the position of said movable member with respect to said coils and generating signals indicative thereof, electric programmers, and means for connecting said programmers to said detectors and said coils, whereby said programmers receive from said detectors signals denoting the position of said movable member with respect to said detectors and cause said coils to be energized in a predetermined sequence such as to provide for a first period of accelerated fall of the movable member as a result of gravity and an accelerating pulse generated by said coils, a second period of free fall of the movable member under the influence of gravity, and a third period of deceleration wherein the effects of the force of gravity are counteracted by the effect of a decelerating pulse generated by said coils in a direction opposite to the force of gravity.

2. Control system as set forth in claim 1 wherein said coils are electrically arranged in two groups, said groups being alternately energized during each of said first and third periods, said movable member being provided with annular projections thereon, and said detectors being arranged to sense the position of said projections with respect thereto and providing a signal upon sensing the presence of one of said projections.

3. A method of controlling an electromagnetic linear motor of the type having a plurality of fixed stationary coils associated with a linearly movable member which is adapted to be held in a fixed position by energizing certain coils selected in accordance with a desired position, the method comprising the steps of: generating electric position signals indicative of the position of said movable member relative to said coils; determining from said position signals which certain coils are to be energized in a predetermined sequence such as to provide for a first period of accelerated fall of the movable member as a result of gravity and an accelerating pulse generated by said coils, a second period of free fall of the movable member under the influence of gravity, and a third period of deceleration wherein the effects of the force of gravity are counteracted by the effects of a decelerating pulse generated by said coils in a direction opposite to the force of gravity; and energizing said certain coils in accordance with the foregoing determination.

References Cited

UNITED STATES PATENTS

| | | | |
|---|---|---|---|
| 3,225,228 | 12/1965 | Roshala | 310—12 |
| 3,374,409 | 3/1968 | Gorka | 318—122 |
| 3,445,688 | 5/1969 | Thorel et al. | 310—14 |
| 3,448,303 | 6/1969 | Thorel et al. | 310—14 |

D. F. DUGGAN, Primary Examiner

U.S. Cl. X.R.

310—14